United States Patent

[11] 3,524,444

[72] Inventors Paul R. Ellard
Greenlawn, New York;
Walter B. Moen, Berkeley Heights, New Jersey
[21] Appl. No. 535,647
[22] Filed March 11, 1966
[45] Patented Aug. 18, 1970
[73] Assignee Air Reduction Company Incorporated
New York, New York
a Corp. of New York

[54] UNDERWATER GAS SUPPLY SYSTEM AND METHOD OF OPERATION
7 Claims, 8 Drawing Figs.

[52] U.S. Cl. .................................................. 128/142,
128/203, 137/111, 137/256
[51] Int. Cl. ...................................................... A62b 7/02
[50] Field of Search........................................ 128/142,
142.2, 147, 191, 202, 203, 204, 140, 142.4, 142.5,
185, 188, 209-211; 137/63 R Digest, 81, 256, 263,
111, 116, 116.3; 61/69-71

[56] References Cited
UNITED STATES PATENTS
1,579,919  4/1926  Drager .......................... 128/191
3,215,057  11/1965  Turek........................... 128/204UXR
3,217,730  11/1965  Banning, Jr................... 137/81X
3,308,817  3/1967  Seele............................. 128/147

Primary Examiner—William E. Kamm
Attorney—Edmund W. Bopp and H. Hume Matthews

ABSTRACT: Apparatus for supplying a breathing atmosphere of mixed gases to a diver comprising a plurality of gas sources each being individually pressure regulated to a pressure above the pressure at the maximum depth of a dive, a pair of parallel gas systems, and a pressure sensing means in close proximity to the diver, each gas system including individual flow control means for adjusting the rates of flow of each of the gases independently of one another; a mixer to which the gases are supplied at the controlled rates of flow, and a surge tank to which the mixed gases are supplied from the mixer, the flow control means of one of said pair of gas systems being adapted to be responsive to the pressure sensing means or manual control; pressure regulation means for regulating the pressure of the mixed gases from one or both surge tanks, respectively, either in response to said pressure sensing means or manual control; a supply line adapted to connect either of said surge tanks to the diver, and valve means for selectively, operatively connecting both of the surge tanks with said diver during manual operation.

Patented Aug. 18, 1970

INVENTORS PAUL R. ELLARD
WALTER B. MOEN
BY
Jonathan Blaut
ATTORNEY

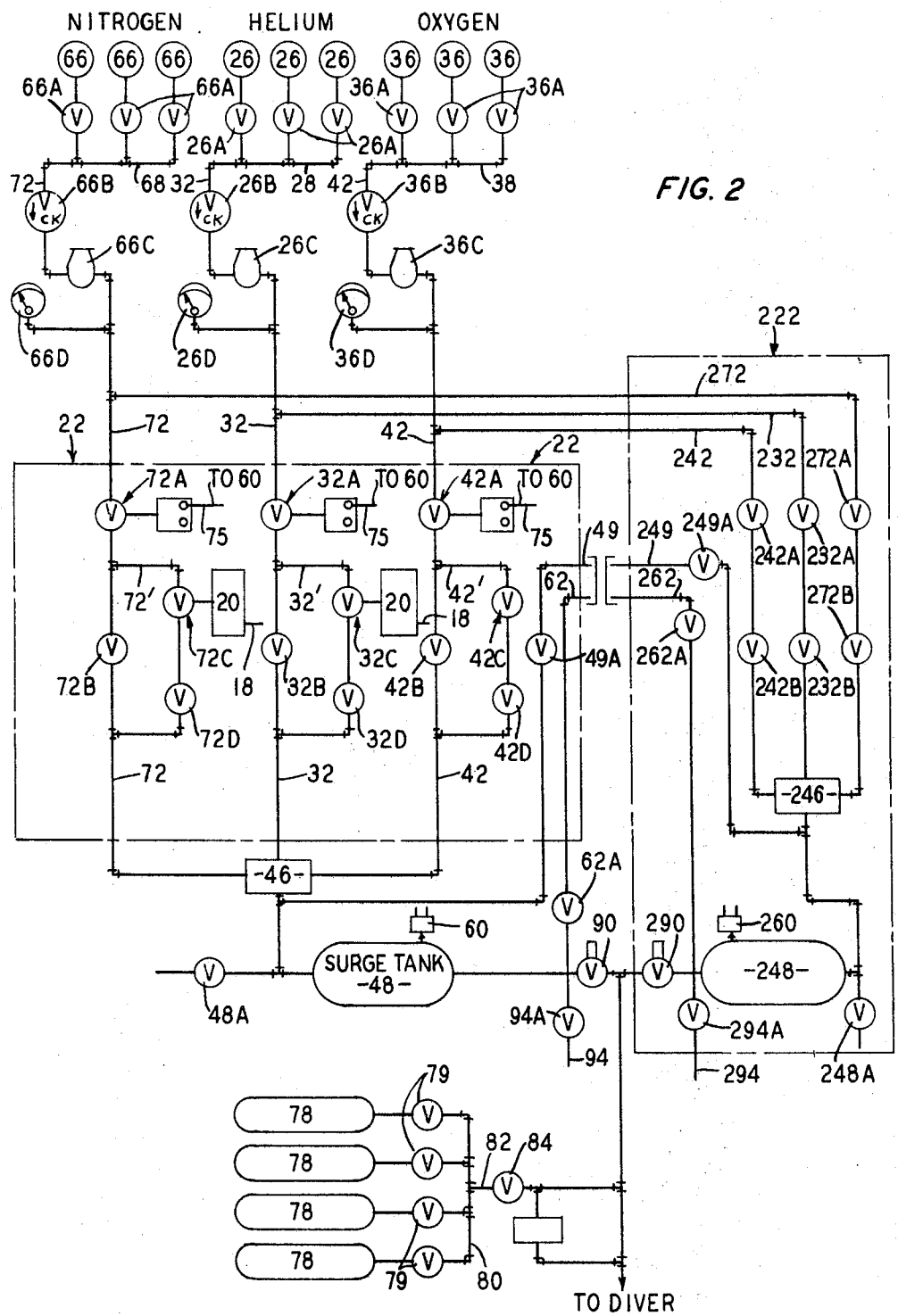

Patented Aug. 18, 1970

INVENTORS PAUL R. ELLARD
WALTER B. MOEN
BY
ATTORNEY

UNDERWATER GAS SUPPLY SYSTEM AND METHOD OF OPERATION

This invention relates to the supplying of breathing atmospheres to divers using non-rigid vehicles and supplied from the surface; commonly referred to as "hard-hat" divers.

The physiological requirements and limitations dictate the condition of the atmosphere that must be delivered to the diver. Up to a depth of three hundred feet, some individuals can utilize air although many would be overcome with either "nitrogen narcosis" or "high-pressure oxygen poisoning". The "normal" working limit with air is one hundred ninety feet, at which depth some divers may be affected by the anesthetic effects of nitrogen (nitrogen narcosis).

In order to avoid the problems of nitrogen narcosis and high-pressure oxygen poisoning, artificial mixtures of oxygen and an inert gas have been utilized for deep diving. To date, the only suitable such mixture has been helium-oxygen. Helium has another important advantage for deep dives where the greatest pressures are reached and where most of the gas supplied to the diver consists of helium. Due to the low molecular weight of helium, the effort required to breathe such a high-pressure gas mixture is much less than if, for example, nitrogen were to be used as the inert gas.

The diver must be supplied with an atmosphere at a pressure only slightly greater than that corresponding to the water pressure at the depth of immersion of the diver. The physiological requirements have been determined for oxygen-helium atmospheres and for oxygen-helium-nitrogen atmospheres, the latter being suitable for more limited depths. The composition must also be controlled in accordance with the length of time that the diver is going to stay down, this period being referred to as "bottom time".

It has been the practice to have gas cylinders containing atmospheres of various compositions and to use different supply cylinders for different depths. This has the disadvantage that one gas composition mixture has to be used over a depth range since there has been no method of continuously varying the mixture as a function of the depth. Thus the diver is forced to use a mixture over a range of depths on an incremental basis.

Another serious disadvantage of the prior art system has been the extremely large amount of cylinder handling that it made necessary with the attendant possibility of introduction of human error.

It is an object of this invention to provide control of the separate constituent gas supplies to a mixer that charges a surge tank from which a diver draws his breathing atmosphere, and to have controls that permit constant change in the composition of the atmosphere as the depth of the diver changes.

It is another object to supply constituent gases for the breathing atmosphere to a surge tank that has a pressure responsive device, such as a pressure operated electric switch, for opening and closing valves that control the flow of gases to a mixture from which the surge tank is supplied.

Another object is to provide a breathing atmosphere control system of the character indicated with a fathometer having a signal read-out device for indicating the proper setting of the controls for the respective gases so as to obtain the desired changes in the composition of the atmosphere with the changes in the depth. In one embodiment of the invention, the change in the controls of the constituent gases of the atmosphere for the diver are operated automatically by the changes in pressure as indicated by a fathometer which is always at the same depth as the diver.

Another object of the invention is to provide an improved method for supplying a breathing atmosphere to a diver so that the most advantageous mixture of gases will be made available to the diver for breathing at the various depths at which he operates.

Other objects, features and advantages of the invention will appear or be pointed out as the description proceeds.

In the drawing, forming a part hereof, in which like reference characters indicate corresponding parts in all the views;

FIGURE 2 is a diagrammatic view showing part of the apparatus of FIGURE 1 in greater detail and showing provisions for supplying nitrogen also to the breathing atmosphere, and provision for using more than one surge tank so that the system can be operated on manual control when desired;

Figure 1:
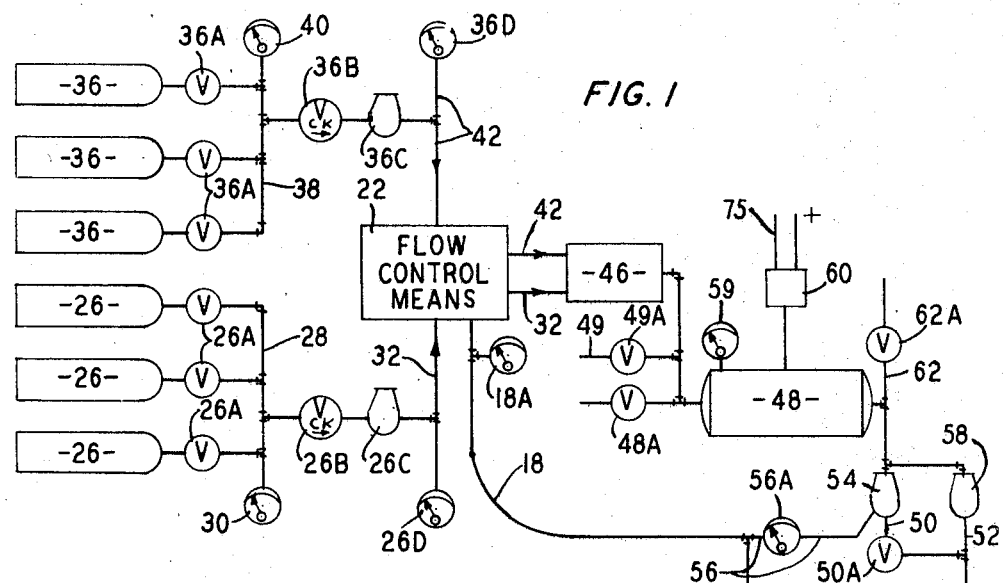
FIGURE 1 is a diagrammatic view showing apparatus for supplying a mixture of oxygen and helium to a diver in accordance with this invention.

FIGURE 1 shows a system for supplying an oxygen and helium atmosphere to a diver 10. There is a supply hose 12 connected with a diving helmet 14 of conventional construction, and the flow of breathing gas to the helmet 14 is controlled by a flow control valve 16 which is manually adjustable by the diver. Another hose 18 leads from a fathometer 20, carried by the diver, to flow control means 22 which constitute a part of the surface supply assembly apparatus. A read-out device 18A connected with the upper portion of the hose 18 indicates at all times the depth of the diver and this is used to check the operation of the apparatus and for controlling the operation automatically when the apparatus is under automatic control.

Helium is supplied to the control means 22 from a bank of cylinders 26, each of which is connected through a shut-off valve 26A, to a helium header 28 having a pressure gauge 30. The helium header 28 communicates through a check valve 26B and a pressure regulator 26C with a conduit 32 leading to the flow control means 22. There is a pressure gauge 26D connected with the conduit 32 for indicating the delivery pressure of the regulator 26C.

In similar manner, oxygen is supplied to the flow control means 22 from a bank of cylinders 36, each of which is connected through a shut-off valve 36A, with an oxygen header 38 having a pressure gauge 40. The oxygen header 38 communicates through a check valve 36B, and a pressure regulator 36C with a conduit 42 leading to the flow control means 22. There is a pressure gauge 36D on the conduit 42 indicating the pressure in the conduit 42 of the gas supplied through the regulator 36C.

The flow control means 22 will be described in connection with FIGURES 2, 5 and 6. For the present, it is sufficient to understand that the different gases are supplied by the flow control means 22 in the proportions required for the particular depth at which the diver is operating, and these gases are discharged through conduits 32 and 42 to a mixer 46 where the gases are mixed and then discharged into a surge tank 48. The tank 48 has dump valve 48A, preferably, but not essentially, a solenoid valve, and has a gas sampling tap 49 commanded by a valve 49A.

From the surge tank 48, the mixed gases from the breathing atmosphere are supplied to the diver through a passage 50 to the hose 12, or through a by-pass passage 52, in parallel with the passage 50. There is a pressure regulator 54 in the passage 50; and this pressure regulator 54 is connected with the fathometer hose 18 by a branch hose 56 for automatically adjusting the delivery pressure of the regulator 54 in accordance with the depth of immersion of the diver.

A shut-off valve 50A in the passage 50 can be used to isolate the passage 50 when the by-pass passage 52 is to be used. There is a pressure gauge 55 at the upper end of the supply hose 12. There is a read-out device 56A on the hose 56 which gives a continuous indication of the depth at which the diver is operating. A pressure regulator 58 in the by-pass passage 52 is manually adjustable to change its delivery pressure and it can be manually adjusted to operate as a shut-off valve when the passage 50 is to be used with its automatic pressure regulation.

The surge tank 48 has a pressure gauge 59, and has a pressure responsive electric switch 60. This switch is for use with automatic controls when the invention is operated with automatic controls. There is a second sampling tube 62 connected with the outlet gas line from the surge tank 48. This second sampling tube 62 is commanded by a shut-off valve 62A.

In the preferred operation of the invention, the breathing atmosphere is supplied to the diver's flow control valve 16 under no flow conditions at a pressure 100 pounds per square inch higher than the bottom pressure of the water. When gas is flowing through the control valve 16, the supply pressure to the control valve is reduced somewhat by the pressure drop through the hose 12.

The manual pressure regulator 58 and the automatic pressure regulator 54 receive gas at surge tank pressure, which varies in accordance with the pressure cycling of the tank 48 and deliver the gas to the hose 12 at the pressure 100 pounds per square inch in excess of bottom pressure.

The surge tank 48 is operated with a minimum pressure of 387 pounds per square inch, this being maximum depth pressure plus 100 pounds per square inch over bottom pressure plus 50 pounds per square inch as allowance for pressure drop across the regulators 54 or 58. Maximum surge tank pressure is preferably about 425 pounds per square inch.

The flow control valves in the control means 22, which will be described in connection with other figures of the drawing, deliver gas at 425 pounds per square inch and have the gas supplied to them at a pressure of 900 pounds per square inch or more. With this pressure difference across the flow control valves, the flow rate through the valves depends only upon the size of the valve opening; this being known as "critical flow"; and the principle is preferably employed in all of the flow control valves of the system.

Because of the high pressure at which gas is supplied to the flow control means 22, it is not possible to use the gas in the cylinders 26 and 36 below about 1,000 to 1,100 pounds per square inch. This is roughly half their initially charged contents; but the cylinders can be recharged with the aid of diaphragm or non-lubricated compressors.

These pressure examples are given by way of illustration. Obviously other pressures may be used, for example, a gas supply method using supercritical storage.

FIGURE 2 shows a bank of nitrogen cylinders 66 connected with a nitrogen header 68 through individual shut-off valves 66A for each cylinder. A conduit 72 connects the header 68 with the flow control means 22 and there is a check valve 66B, regulator 66C, and pressure gauge 66D at spaced locations along the conduit 72.

The flow control means 22, as shown in FIGURE 2 includes a solenoid-operated shut-off valve 32A commanding the conduit 32; a similar solenoid-operated shut-off valve 42A commanding the conduit 42; and a solenoid-operated flow control valve 72A commanding the conduit 72. Each of the valves 32A, 42A and 72A has a conductor 75 connecting the valve with the pressure switch 60 of the surge tank 48. Thus the operation of the pressure switch 60 in response to changes in pressure in the surge tank controls the opening and closing of the valves 32A, 42A and 72A. The valves are constructed and arranged so that when the pressure in the surge tank 48 rises to a predetermined maximum, the pressure switch 60 operates to cause all of the valves 32A, 42A and 72A to close their respective conduits 32, 42 and 72. When sufficient pressure has been withdrawn from the surge tank 48, as a result of demand for breathing atmosphere by the diver, the pressure in the surge tank drops to a predetermined minimum and the pressure switch 60 operates to cause all of the valves 32A, 42A and 72A to open.

When the valve 32A is open, helium can flow from the valve 32A through a metering valve 32B which is manually adjustable and which is in series with the valve 32A in the conduit 32 leading to the mixer 46. This manually adjustable metering valve 32B is, therefore, a manual flow control valve in the conduit 32.

There is a by-pass conduit 32' in parallel with a portion of the length of the conduit 32 which contains the metering valve 32B. This by-pass conduit 32' contains an automatic flow control and metering valve 32C in series with a manually operated shut-off valve 32D which is used for closing the by-pass 32' when the apparatus is not to be used for automatic operation. The automatic flow control valve 32C is connected with the fathometer hose 18 and its construction will be described in connection with FIGURES 5 and 6. For the present it is sufficient to understand that this valve 32C opens progressively wider as the pressure in the fathometer hose increases with greater depth of immersion of the fathometer. Thus the flow of helium increases as the depth increases since a larger proportion of the atmosphere must be helium at greater depths.

The conduit 42, which supplies oxygen to the mixer 46, contains a manually adjustable metering valve 42B corresponding to the metering valve 32B in the conduit 32. There is also a by-pass conduit 42' containing another flow control and metering valve 42C in parallel with the flow control valve 42B and in series with a shut-off valve 42D. The flow control valve 42C is manually adjustable and provides a standby for the valve 42B; but the flow of oxygen does not change with change in the pressure in the fathometer hose and there is, therefore, no connection between the valve 42C and the fathometer hose.

The conduit 72 has controls in the flow control means 22 similar to those of the conduit 32; that is, there is a manually controlled metering valve 72B in series with the solenoid operated shut-off valve 72A; there is a by-pass conduit 72' containing an automatic flow regulating and metering valve 72C and a manual shut-off valve 72D for isolating the by-pass 72' when the apparatus is being operated entirely under manual control. The metering valves 32B; 32C; 42B; 42C; 72B; and 72C are operated with an upstream pressure sufficient to result in a critical pressure drop across these valves. Like the automatic control 32C, the automatic control 72C is connected with the fathometer hose 18 and is operated in accordance with the change in depth of the fathometer, but not to change the flow in the same way, as will be explained in connection with FIGURES 5 and 6.

From the mixer 46, the gases are supplied to the surge tank 48 and from the surge tank to the diver as already explained in connection with FIGURE 1. There is an auxiliary safety system shown in FIGURE 2 which is not on the system illustrated in FIGURE 1, and this auxiliary safety system includes a group of gas storage cylinders 78 each with its own shut-off valve 79; and with the cylinders connected to a common header 80 connected by a conduit 82 to a portion of the piping system which supplies gas to the diver. The cylinders 78 contain gas of a predetermined mixture which provides a suitable atmosphere for a particular depth of immersion and which can be used for a range of depths, as previously explained. If desired, there may be several groups of cylinders, similar to the cylinders 78, and containing different gas mixtures for use at different depths.

FIGURE 2 shows another feature which is included in the system for use when the system is being used entirely for manual operation. There is a second surge tank, a second mixer and there are manually controlled shut-off and flow control valves similar to those already described but for use in charging a second surge tank. These additional parts making up a second section of the system are indicated by the same reference characters as the parts of the section already described but with a numeral "2" preceding each reference character. The conduits 32, 42 and 72 connect with 232, 242 and 272, respectively. A second flow control means 222, has no by-passes around the control valves because the flow control means 222 is never used when the system is being operated by automatic controls.

The reason for having the second flow control means 222 is that with the apparatus being used under manual control, the attendant charges the surge tank 48 with the proportion of gases for a particular depth and then operates manual flow controls 232B, 242B and 272B to charge the other surge tank 248 with the proper mixture of gases for a somewhat greater depth. As the diver descends further, the supply of gas from the surge tank 48 is shut off by closing a solenoid-operated shut-off valve 90 and the supply of gas from the other surge tank 248 is released to the divers supply hose 12 by opening a solenoid-operated shut-off valve 290 of the flow control means 222.

Solenoid valves 90 and 290 are so arranged that one is always open when the system is in operation.

The surge tank 48 may be "dumped" by opening the valve 48A and when the pressure in the surge tank has been released so that the gas remaining is nearly that at atmospheric pressure, or substantially so, the dump valve 48A is closed and the surge tank 48 is recharged by adjusting the manual flow control valves so as to obtain a supply of gas in the surge tank 48 which will be correct for a depth somewhat greater than that for which the gas in the surge tank 248 is proportioned. Thus the attendant can always keep one surge tank ready to supply the diver with a different atmosphere as he descends to greater depth. Conversely, the surge tanks 48 and 248 can be charged successively to supply breathing atmospheres for divers who are ascending to lesser depths.

When the system is operating under automatic control, the second surge tank 248 and the valves and other connections for filling it are not necessary because the proportions of the gases supplied to the surge tank 48 are changed automatically in proportion to the changes in the depth of the fathometer, and the breathing atmosphere supplied to the diver changes as the gas in the surge tank is used and new gas flows into the tank in the new proportions. If the diver is making a rapid descent and wants the atmosphere to change rapidly he can cause this to occur with the automatic control by operating his own manual flow control valve 16 so as to draw much more gas than he actually needs so that the replacement gas in the surge tank with the new proportions of the constituent gases will reach the supply hose with less time delay. Although theoretically ideal compositions for the breathing atmosphere have been worked out for different depths, the actual atmosphere required by the diver is not so critical that the same atmosphere cannot be used over a range of depths, as has already been explained. It is advantageous, however, to have the capacity of the surge tank of moderate volume so that one charge does not last so long that there is a prolonged time delay in getting an atmosphere of different composition when the diver's depth changes.

Each of the flow control means also preferably has a SCUBA filling line 94 and 294 with shut-off valves 94A and 294A, respectively as shown in FIGURE 2.

Figure 3:
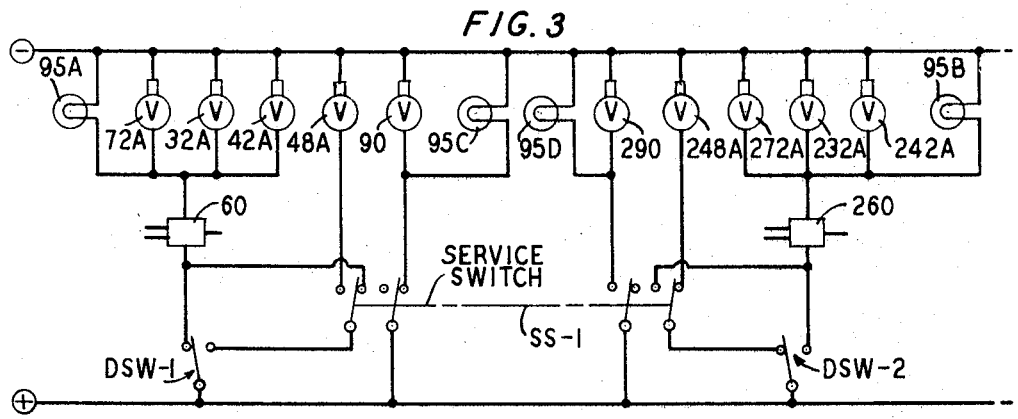
FIGURE 3 is a wiring diagram for the apparatus shown in FIGURE 2.

FIGURE 3 shows a wiring diagram for the system shown in FIGURE 2 and shows the switches for manually operating the system when using both surge tanks, and also shows signal lamps for indicating which circuits ar are closed.

A signal lamp 95A is connected in parallel with the solenoid-operated shut-off valves 32A; 42A; and 72A; and the lamp 95A is lighted when the pressure switch 60 on the surge tank is closed and supplies power to the solenoids of these valves 32A; 42A; and 72A. There is a signal lamp 95B in parallel with the solenoid-operated shut-off valves 232A; 242A; and 272A; and the lamp 95B is lighted when pressure switch 260 on the surge tank 248 is closed.

There are other signal lamps 95C and 95D connected in series with the solenoid valves 90 and 290, respectively, that control flow of gases from the different surge tanks to the diver.

A switch indicated by the legend "service switch" has four blades connected together by a common operator SS-1 so that all four blades operate as a unit; and when the circuit is closed to the valve 90, the circuit to the valve 290 is open. Also, it is not possible to supply power to the solenoids of both dump valves 48A and 248A at the same time.

There is another switch DSW-1 for supplying power to the solenoid that operates the dump valve 48A for the surge tank 48; and there is a corresponding switch DSW-2 for supplying power to the solenoid that operates the dump valve 248A, preferably but not essentially a solenoid valve, of the other surge tank. These switches DSW-1 and DSW-2 are operable independently of the service switch, but the circuit is such that the operation is substantially "fool proof", there being end blades of the service switch in series with the switches DSW-1 and DSW-2 so that a surge tank cannot be accidentally dumped while its valve 90 or 290 is open to supply gas to the diver.

Figure 4:
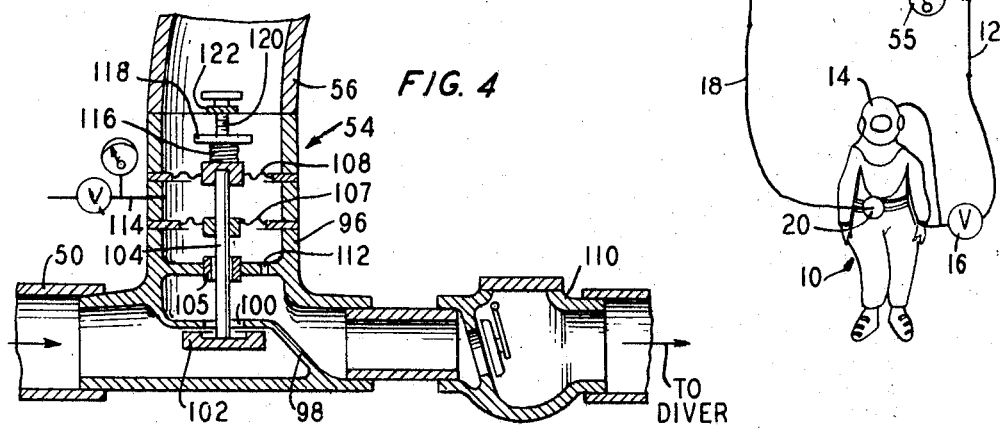
FIGURE 4 is a greatly enlarged sectional view through one of the automatic pressure regulators shown in the diagram of FIGURE 2.

FIGURE 4 is a diagrammatic showing of the automatic pressure regulator 54. This regulator 54 includes a housing 96 having a partition 98 with a passage 100 commanded by a valve 102. The valve 102 has a stem 104 extending through a guide bearing 105 and connected with the center portions of two spaced apart diaphragms 107 and 108.

The upstream side of the regulator 54 is connected with the passage or conduit 50 so that gas enters the housing 96 in the direction indicated by the arrow in FIGURE 4. The downstream end of the regulator 54 is provided with a check valve 110 constituting the delivery or outlet end of the regulator 54 for supplying gas under controlled pressure to the diver as already explained in connection with FIGURE 1.

The space in the housing 96 under the diaphragm 107 is exposed to the pressure on the downstream side of the valve 102 as the result of a connecting orifice 112. The space between the diaphragms 107 and 108 connects with a vent and excess flow line 114; and the space above the upper diaphragm 108 is exposed to the pressure in the fathometer hose 56.

A spring 116 is compressed between the upper diaphragm 108 and a stop 118 at the lower end of a screw 120 which threads through a fixed beam 122 that spans the upper end of the housing 96. The pressure of the spring 116 can be increased or decreased by screwing the stop 118 down or by screwing it up as desired to change the delivery pressure of the regulator 54 with respect to the fathometer signal pressure in the branch hose 56.

The areas of the diaphragms 107 and 108 are preferably equal and the reason for using two diaphragms is to provide a chamber into which gas may bleed in the event of rupture of either diaphragm. This vented space between the diaphragms 107 and 108, normally at about one atmosphere pressure, leads to an excess flow valve in line 114 so that upon failure of either diaphragm there will be considerable flow in the vent line causing the excessive flow valve to close and produce a pressure rise in the chamber which will be indicated by a gauge in a visual audio alarm. This permits prompt action in isolating the defective regulator and switching to the manually controlled regulator 58 (FIGURE 1).

The spring 116 permits the regulator 54 to be operated with a one hundred pound per square inch bias in the delivery pressure of the regulator in excess to the bottom pressure as indicated by the branch hose 56. This value is given merely by way of illustration. The check valve 110 prevents back flow to the regulator from the hose in the event of a sudden lowering of pressure as a result of inadvertent operation of the system. Ordinarily, the only changes in the upstream pressure of the gas supplied to the regulator 54 is that caused by pressure cycling of the surge tank.

The physiological requirements have been defined by the U.S. Navy for breathing atmospheres for divers at various depths. These are shown in Tables I and II below. Table I presents a system using oxygen, helium and nitrogen; whereas Table II is for a system using oxygen and helium only, though it is desirable to include a small amount of nitrogen in the atmospheres of Table II as will be explained.

TABLE I.—OXYGEN-NITROGEN-HELIUM

| Submersion Depth (ft.) | Gas Composition Supplied (vol. percent) | | | Allowable Deviation of Concentrations (vol. percent) | | |
|---|---|---|---|---|---|---|
| | $N_2$ | He | $O_2$ | $O_2$ in Total Mixture | $N_2$ plus He in Total Mixture | $N_2$ and He in $N_2$ plus He Mixture |
| 500 | 20 | 70 | 10 | ±0.5 | ±0.5 | ±2.0 |
| 330 | 35 | 45 | 20 | ±0.5 | ±0.5 | ±2.0 |
| 200 | 37 | 37 | 26 | ±0.5 | ±0.5 | ±2.0 |
| 140 | 30 | 30 | 40 | ±0.5 | ±0.5 | ±2.0 |
| 100 | 25 | 25 | 50 | ±0.5 | ±0.5 | ±2.0 |

TABLE II

| Submersion Depth (ft.) | Gas Composition Supplied (vol. percent) | | |
|---|---|---|---|
| | $N_2$ | He | $O_2$ |
| 500 | (1) | 90 | 10 |
| 400 | (1) | 85 | 15 |
| 300 | (1) | 80 | 20 |

1 System should have provision for adding 1% $N_2$.

Figure 7:
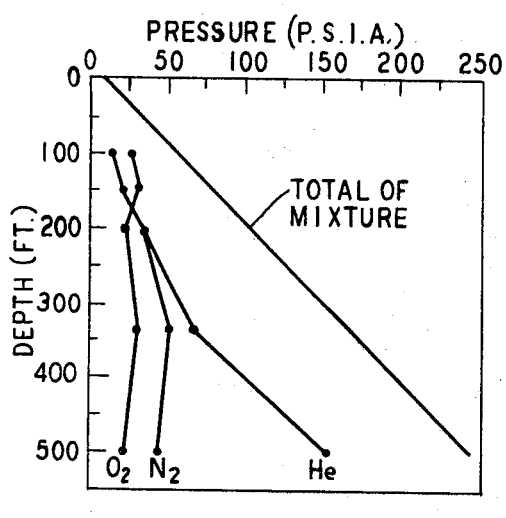
FIGURES 7 and 8 are graphs showing variations of partial pressures and total pressures according to the depth of water.

FIGURE 7 of the drawing shows the partial pressure of each of the constituent gases at the different depths and also shows the total pressure of the mixture. It will be noted from FIGURE 7 that the oxygen partial pressure can for all practical purposes be considered constant at two atmospheres absolute. The nitrogen partial pressure increases to about fifty pounds per square inch absolute at three hundred feet of depth, and then remains substantially constant for greater depths. The partial pressure of helium on the other hand, increases with depth but not linearly.

Figure 8:
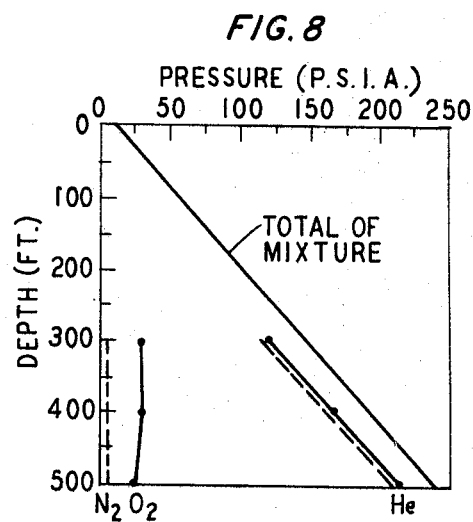

FIGURE 8 shows the composition of the breathing atmosphere using oxygen and helium only for depths from three hundred to five hundred feet. The partial pressure of oxygen is substantially constant and the partial pressure of the helium increases linearly with an increase in depth. FIGURE 8 shows in dotted lines the addition of 1% nitrogen. This merely has the effect of reducing the partial pressure of the helium; the partial pressure of the oxygen remaining substantially constant.

Not shown on the curves of FIGURES 7 and 8, but which should be mentioned, are the effects of increasing bottom time of the diver. For example, an oxygen pressure "$P_0$" of two atmospheres absolute is used for all bottom times less than 30 minutes and for each 10 minute increase in bottom time beyond 30 minutes a decrease in oxygen pressure of 0.1 atmosphere desirable. "$P_0$" for bottom time of one hour will be computed as follows:

$$P_0 = 2 - [(60-30)/10]0.1 = 1.7 \text{ atmospheres}$$

Figure 5:
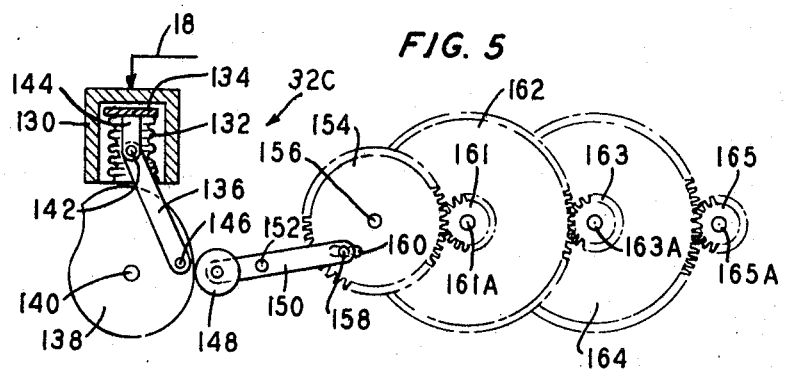
FIGURE 5 is a greatly enlarged, diagrammatic view showing one of the automatic flow control valves used in the assembly shown in FIGURE 2.

FIGURE 5 shows a construction for the flow control valve 32C. The other flow control valve 72C may be of identical construction or may be constructed as shown in FIGURE 6; or both of the valves 32C and 72C may be constructed as shown in FIGURE 6.

FIGURE 5 shows a cylinder 130 in which there is a bellows 132 connected at its lower edge to the lower end of the cylinder 130. The bellows 132 has an upper end plate 134 which moves up and down in the cylinder 130 in response to variations in the pressure in the cylinder 130. This pressure is that supplied by the fathometer and pressures transmitted to the cylinder 130 by the fathometer hose 18. The side wall of the bellows 132 is made of spring material which normally holds the end plate 134 at a high level near the top of the cylinder 130. As pressure in the cylinder increases, the end plate 134 is moved downward.

The reciprocating movement of the end plate 134 up and down in the cylinder 130 is transmitted through a connecting rod 136 to a cam 138. This cam 138 is mounted for rotation on an axle 140. The connecting rod 136 is connected with the end plate 134 of the bellows by a pivot connection 142 on a lug 144 attached to the bottom of the plate 134. The lower end of the connecting rod 136 is pivotally connected to the cam 138 by a crankpin 146.

A cam follower 148 runs on the surface of the cam 138. This cam follower is rotatably supported on one end of a lever 150 which rocks about a fixed fulcrum 152. Movement of the cam follower 148 rocks the lever 150 about its fulcrum 152 and this causes a gear wheel 154 to oscillate about its axle 156. Motion is transmitted from the lever 150 to the gear 154 through a crankpin 158 operating in a slot 160 in the gear 154.

The gear 154 meshes with a smaller gear 161 secured to a larger gear 162 and rotatable as a unit with the larger gear on an axle 161A. The larger gear 162 meshes with a small gear 163 secured to a larger gear 164; both of these gears 163 and 164 turning as a unit about an axle 163A.

The large gear 164 meshes with a small gear 165 secured to an axle 165A which operates a valve for controlling the flow of gas. The gear train consisting of the gears 161-165 is supplied for the purpose of converting a small motion of the cam follower 148 to a much larger motion for displacing the valve which controls the flow of gas.

The connection of the axle 165 to the valve is oriented so that the valve opens wider to admit more gas when the bellows in the cylinder 130 is displaced by an increase in pressure indicating a greater depth for the diver which calls for more gas of the kind which the mechanism of FIGURE 5 is used to control. For example, when the valve mechanism of FIGURE 5 is used for controlling the flow of helium, then the cam 138 is shaped to obtain the relative helium composition set forth in Table I in correspondance to pressures from the fathometer giving the depths indicated on the different lines of that table. Similarly the cam 138 may be designed for controlling the flow of nitrogen so as to obtain the proportions set forth in Table I in response to the respective pressures as indicated by the pressure from the fathometer. No change in the oxygen flow is required since the flow of helium and nitrogen are proportioned so as to be correlated with the oxygen as has already been explained.

Figure 6:
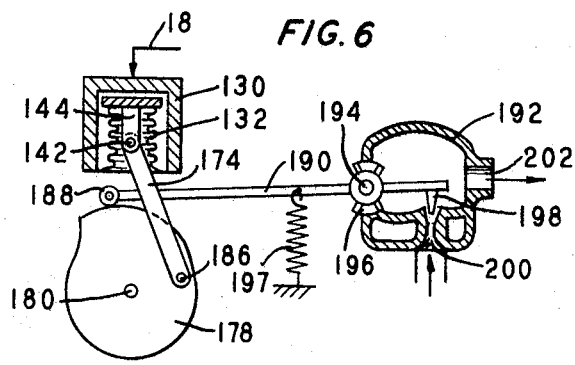
FIGURE 6 is a view of a modified form of the automatic flow control valve shown in FIGURE 5.

FIGURE 6 shows the cylinder 130 with the bellows 132 connected to the lower part of the cylinder and having a lug 144 connected by the pivot 142 to a connecting rod 174 which imparts rotary motion to a cam 178 rotatable about a fixed axis 180. The connecting rod 174 is connected with the cam 178 by a crankpin 186. A cam follower 188 on the end of a long lever arm 190 extends into a valve housing 192.

The lever 190 oscillates about a bearing fulcrum 194 and has seals 196 for preventing leakage of gas from within the valve housing 192. There is a spring 197 under tension for holding the cam follower 188 against the surface of the cam 178.

At the end of the lever 190 which is located within the valve housing 192, there is a needle valve 198 which moves toward and from an inlet orifice 200 to control the flow of gas into the valve housing 192. A controlled flow of gas discharges from the valve housing 192 through an outlet 202.

As in the case of the cam 138 shown in FIGURE 5, the cam 178 is cut to reflect the gas composition schedule shown in Tables I and II. The flow control apparatus shown in FIGURE 6 has one important advantage over that shown in FIGURE 5 in that it is not subject to backlash such as is found in gear trains and therefore can be made to give more accurate control of the gas.

The preferred embodiments of the invention have been illustrated and described, but changes and modifications can be made, including variations in pressure schemes, and some features can be used in different combinations without departing from the invention as defined in the claims.

We claim:

1. Apparatus for supplying the breathing atmosphere to a diver at different depths of submersion, including in combination, supply conduits for different kinds of gas; independent flow control means in each of the supply conduits; a mixer connected with all of said supply conduits and into which gases from the different conduits flow simultaneously and are mixed in proportion to their flow rates as controlled by said independent flow control means; a tank connected to said mixer by a conduit and receiving the mixed gases flowing from the mixer; a delivery conduit from the tank for supplying the mixed gases to a diver; each of the flow control means including a valve movable into different positions to change the rate of flow of gas through that valve; a power actuator for moving at least one of the valves; and a pressure-responsive control for the actuator; pressure sensing means exposed to water pressure at the depth at which the diver is working; means for connecting said pressure responsive control with said pressure sensing means; a pressure regulator in the delivery conduit to the diver; said pressure regulator being adjustable to change its delivery pressure; and a mechanical actuator that adjusts the pressure regulator; said mechanical actuator having a pressure-responsive controller; and means for operably connecting the controller with the pressure responsive means whereby the pressure regulator is adjusted to compensate for changes in the depths at which the diver is working.

2. The apparatus described in Claim 1 characterized by a second flow control valve in parallel with the flow control valve operated by said power actuator, said second flow control valve being manually adjustable to change the rate of flow of gas, and means for shutting off flow of gas through the valve operated by the power actuator whereby the control of flow is under manual control.

3. The apparatus described in Claim 1 characterized by pressure regulators for supplying each of the gases to the individual flow control means at substantially the same pressure.

4. Apparatus for supplying a breathing atmosphere of mixed gases to a diver comprising in combination a plurality of gas source means and a plurality of parallel gas systems, each gas system including individual flow control means for each of the source means for adjusting the rates of flow of the gases independently of one another, first conduits connecting respective ones of said source means and flow control means, a mixer to which the gases are supplied at the controlled rates of flow, a second conduit connecting each of said control means in gas flow relation to said mixer, solenoid-operated shut-off valves for opening and closing the flow of each of the gases to said mixer, a surge tank to which the mixed gases are supplied from the mixer, a third conduit connecting said mixer with said tank in gas flow relation, a pressure-operated switch communicating with the interior of said tank and responsive to the pressure therein, said pressure-operated switch being in the circuits of the solenoid-operated shutoff valves for controlling the opening and closing of those valves in accordance with the pressure of the mixed gases within said surge tank, an individual valve for said surge tank for dumping gas remaining in that surge tank after a desired use of a particular mixture so as to make room for a different mixture corresponding to a different depth for the diver, means for preventing operation of the solenoid-operated shutoff valve to supply gas to the mixer associated with said tank for which the dump valve is open, a delivery conduit connected to the surge tank and adapted to be connected to a diver for conducting flow of the gas mixture from said tank to the diver, and valve means for selectively, operatively connecting the delivery conduits from the different surge tanks with a supply line to the diver.

5. The apparatus described in Claim 4, wherein said source means comprises cylinders in which the constituent gases are stored, manifolds connecting together cylinders containing the same kind of gas, and pressure regulators for each kind of gas for supplying the gases to the flow control means at substantially equal pressure.

6. The apparatus described in Claim 5 characterized by a common supply line to the diver from the delivery conduits of the surge tanks, and a pressure regulator in said common supply line adjustable to change the pressure in the common supply line in accordance with the depth at which the diver is operating.

7. The method of supplying a breathing atmosphere of mixed gases to a diver which comprises supplying separate streams of the constituent gases at regulated pressures, controlling the flow of each stream of gas in accordance with the desired proportion of that gas in the mixed atmosphere, varying the flow of the different gases to obtain mixtures suitable for different depths, bringing the gas streams together at a mixing station, maintaining a predetermined volume of the mixed gases under pressure at one location, and while the diver is being supplied with a breathing atmosphere from the mixed gases at said location controlling the flow of the gases in separate streams in accordance with a new desired proportion of the gases for a depth different from that at which the diver is then working but a depth which the diver will next approach, mixing the gas in the new desired proportions, maintaining a predetermined volume of the mixed gas in the new proportions under pressure at a second location until the diver changes his depth to one for which the new proportions are appropriate, then supplying the atmosphere from the second location to the diver while the gas from the first location is shut off, dumping the remaining gas from the first location, and recharging the volume of the first location with mixed gases in still other proportions for another depth to which the diver will move.